US008392783B2

(12) United States Patent
Kang et al.

(10) Patent No.: US 8,392,783 B2
(45) Date of Patent: Mar. 5, 2013

(54) SYSTEM AND METHOD FOR REUSING RADIO RESOURCES

(75) Inventors: Yeon Su Kang, Daegu (KR); Kun Seok Kang, Daejeon (KR); Do-Seob Ahn, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 390 days.

(21) Appl. No.: 12/746,306

(22) PCT Filed: Nov. 7, 2008

(86) PCT No.: PCT/KR2008/006580
§ 371 (c)(1),
(2), (4) Date: Jun. 4, 2010

(87) PCT Pub. No.: WO2009/075479
PCT Pub. Date: Jun. 18, 2009

(65) Prior Publication Data
US 2010/0251053 A1 Sep. 30, 2010

(30) Foreign Application Priority Data

Dec. 11, 2007 (KR) .................. 10-2007-0128429

(51) Int. Cl.
*G08C 25/02* (2006.01)
(52) U.S. Cl. .................. 714/748; 455/7; 455/9
(58) Field of Classification Search .................. 714/748; 455/7, 9
See application file for complete search history.

(56) References Cited

U.S. PATENT DOCUMENTS

| 5,636,230 | A * | 6/1997 | Marturano et al. ........... 714/748 |
| 2005/0130587 | A1 * | 6/2005 | Suda et al. ........................ 455/9 |
| 2005/0282542 | A1 | 12/2005 | Karabinis |
| 2006/0003697 | A1 * | 1/2006 | Asai et al. ..................... 455/11.1 |
| 2006/0067282 | A1 * | 3/2006 | Sherman et al. ............... 370/338 |
| 2006/0084377 | A1 * | 4/2006 | Lee et al. ........................... 455/9 |
| 2006/0141928 | A1 * | 6/2006 | Hosokawa et al. ............... 455/9 |
| 2007/0081502 | A1 | 4/2007 | Lee et al. |
| 2007/0086368 | A1 | 4/2007 | Lee et al. |
| 2008/0313519 | A1 * | 12/2008 | Tseng ........................... 714/748 |
| 2010/0251053 | A1 * | 9/2010 | Kang et al. ..................... 714/748 |

FOREIGN PATENT DOCUMENTS

| JP | 2006-246002 A | 9/2006 |
| KR | 2005-0117172 A | 12/2005 |
| KR | 2007-0038658 A | 4/2007 |
| KR | 2007-0042224 A | 4/2007 |
| KR | 10-0745086 B1 | 7/2007 |

OTHER PUBLICATIONS

"S-Band Digital Mobile Satellite Broadcasting System", Jun Mitsugi et al., Vehicular technology conference, vol. 5, Sep. 1999, pp. 2755-2459.

* cited by examiner

*Primary Examiner* — Yolanda L Wilson
(74) *Attorney, Agent, or Firm* — Rabin & Berdo, P.C.

(57) ABSTRACT

The present invention relates to a system and method of reusing radio resources capable of improving radio resource efficiency. According to an embodiment of the present invention, in a communication system including a repeater that retransmits signals transmitted from a satellite to user terminals, it is possible to reuse some of the radio resources used in a wide area coverage, such as the satellite, in a repeater coverage. Therefore, it is possible to ensure radio resources such that repeater data can be transmitted to user terminals without additional radio resources.

12 Claims, 3 Drawing Sheets

SYSTEM AND METHOD FOR REUSING RADIO RESOURCES

TECHNICAL FIELD

The present invention relates to a system and method for reusing radio resources to improve radio resource efficiency.

The present invention was supported by the IT R&D program of MIC/IITA [2005-S-014-03, Development of Satellite IMT2000+ Technique].

BACKGROUND ART

Repeaters used in the current wireless communication system can be variously defined according to their functions and purposes. For example, the repeater may be defined to perform most of the functions of a base station or a gateway. Alternatively, the repeater may be defined to receive signals transmitted from a base station or a satellite and retransmit the received signals to allow a user in a shadow area to perform communication.

When the repeater of the latter concept is used, the repeater can use radio resources used in a system including the repeater according to characteristics of the system. However, in general, the radio resources used in a system cannot be reused, and accordingly, efficiency of the entire communication system is deteriorated.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a system for reusing radio resources in which a repeater can reuse reusable radio resources among all radio resources of the system, and a method of reusing radio resources.

Technical Solution

According to an aspect of the invention, a method of reusing radio resources includes: measuring the intensities of a plurality of radio signals that are transmitted from a first terminal group including a plurality of terminals positioned in a first communication area to a wide area transmitting/receiving apparatus; determining whether there is repeater data to be transmitted to a second terminal group including a plurality of terminals positioned in a second communication area; when it is determined that there is repeater data to be transmitted, setting priority in order to reuse a plurality of radio resources that transmit the plurality of radio signals on the basis of the measured intensities of the plurality of radio signals; and selecting a reusable radio resource on the basis of the set priority, and transmitting the repeater data to the terminals included in the second terminal group using the selected reusable radio resource.

According to another aspect of the invention, a system for reusing radio resources includes: a signal receiving unit that receives a plurality of radio signals transmitted from a first terminal group including a plurality of terminals positioned in a first communication area to a wide area transmitting/receiving apparatus; a radio resource reuse unit that calculates the intensities of the plurality of received radio signals, and determines reusable radio resources that will be reused in the second communication area among the plurality of radio signals on the basis of the calculated intensities of the plurality of radio signals; a repeater data management unit that manages repeater data to be transmitted to a second terminal group including a plurality of terminals positioned in a second communication area; and a signal transmitting unit that transmits the determined reusable radio resources and the repeater data to the terminals included in the second terminal group.

Advantageous Effects

According to the above-mentioned aspects of the present invention, it is possible to reuse satellite radio resources. Therefore, it is possible to ensure radio resources such that repeater data can be transmitted to user terminals without additional radio resources.

MODE FOR THE INVENTION

Figure 1:
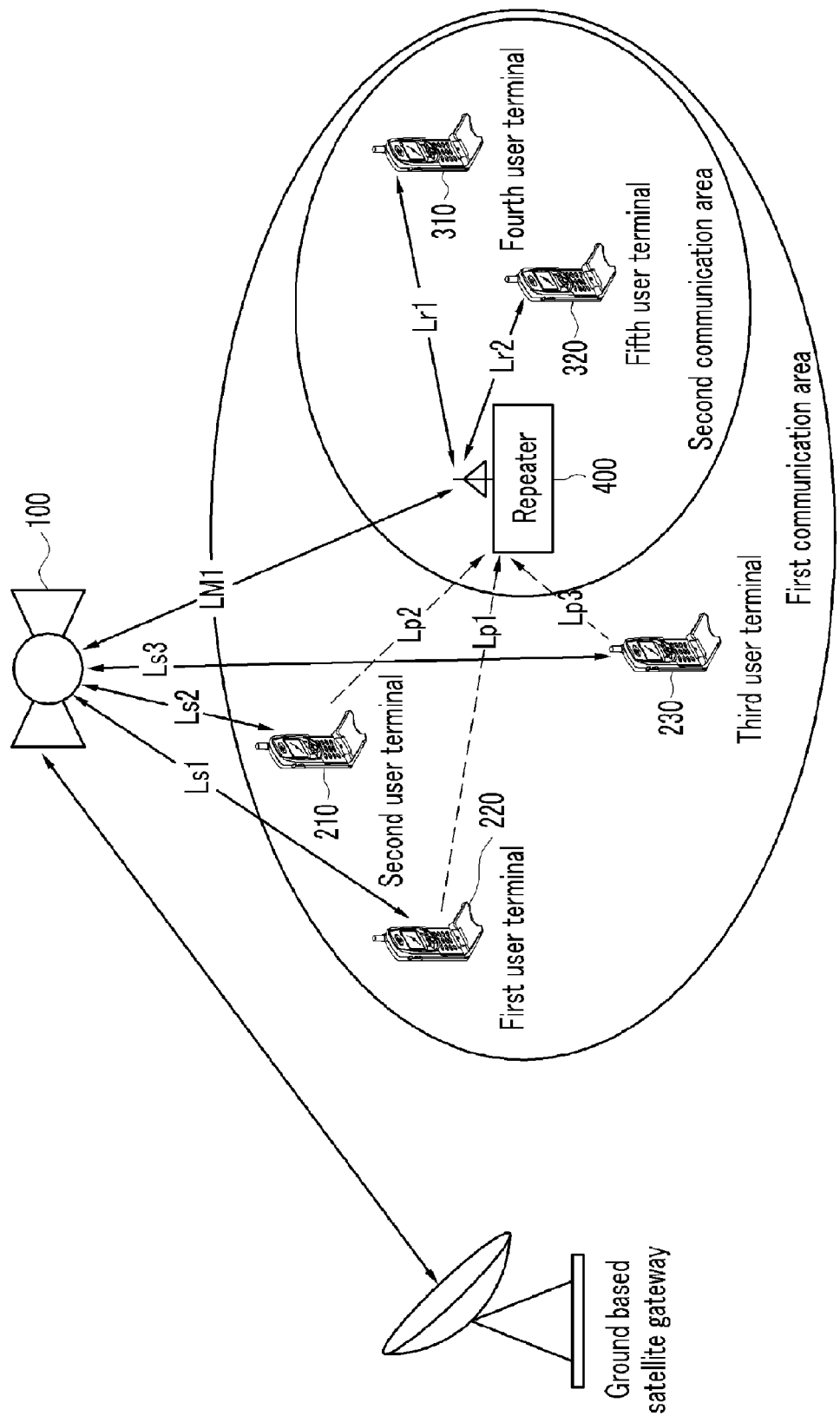
FIG. 1 is a diagram illustrating an example of a satellite communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise", and variations such as "comprises" and "comprising", will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In the specification, a terminal may be referred to as a mobile station (MS), a mobile terminal (MT), a subscriber station (SS), a portable subscriber station (PSS), user equipment (UE), or an access terminal (AT). The terminal may include some or all of the functions of the mobile station, the mobile terminal, the subscriber station, the portable subscriber station, the user equipment, and the access terminal.

In a communication system, various types of repeaters are defined according to their functions and structures. Among various types of repeaters, a repeater according to an exemplary embodiment of the present invention has the following characteristics, but is not necessarily limited thereto.

First, data signals transmitted from a wide area transmitting/receiving apparatus are retransmitted to a user terminal in a shadow area. The wide area transmitting/receiving apparatus includes a satellite or a base station in a system environment.

Second, a carrier, a bandwidth, and a data transmission method (air interference) used for the satellite or the base station to transmit data to a user terminal are the same as those for the repeater to transmit data to the user terminal.

Third, connection between the satellite and the repeater may be the same or different from the carrier, the bandwidth, and the transmission method used for communication between the satellite and the user terminal.

Fourth, the repeater according to an exemplary embodiment of the present invention has its unique data to be transmitted to the user terminals that are in a repeater area and communicate with the repeater.

Next, a communication system including the repeater having the above characteristics will be described with reference to FIG. 1. For clarity of description, a satellite communication system using a satellite will be described as an example of the communication system according to the exemplary embodiment of the present invention. However, the invention is not limited thereto.

Further, the technique according to the exemplary embodiment of the present invention may be applied to communication systems using various transmission schemes, such as OFDM/OFDMA (orthogonal frequency division multiplexing/orthogonal frequency division multiple access), CDM/CDMA (code division multiplexing/code division multiple access), WCDM/WCDMA (wideband CDM/wideband CDMA), FDM/FDMA (frequency division multiplexing/frequency division multiple access), and TDM/TDMA (time division multiplexing/time division multiple access). However, for convenience of description, a satellite communication system using the OFDM/OFDMA transmission scheme will be described as an example of the communication system.

FIG. 1 is a diagram illustrating an example of a satellite communication system according to an exemplary embodiment of the present invention.

As shown in FIG. 1, the communication area of the satellite communication system including a repeater is mainly divided into a first communication area and a second communication area.

The first communication area means a satellite coverage where direct communication between a satellite 100 and user terminals 210, 220, and 230 can be performed. A communication link between the satellite 100 and the user terminals 210, 220, and 230 positioned in the first communication area is represented by Ls, and links between the satellite 100 and the user terminals 210, 220, and 230 positioned in the first communication area are represented by Ls1, Ls2, and Ls3, respectively.

In addition, the intensity of a signal transmitted from each user terminal to the satellite is transmitted to a repeater 400 through a communication link between each user terminal and the repeater 400. In this case, the link is represented by Lp. The link Lp is set as a one-way link from the terminals to the repeater.

The second communication area means a repeater coverage where the user terminals 310 and 320 can communicate with the satellite 100 through mainly the repeater 400. The terminals 310 and 320 belonging to the second communication area can receive signals transmitted from the satellite 100 through the repeater 400, and transmit signals to the satellite 100 through the repeater 400.

In this case, no satellite signal or only a weak satellite signal is transmitted from the satellite 100 to the second communication area due to, for example, shadowing. Therefore, the intensity of the satellite signals transmitted to the user terminals 310 and 320 is lower than the signal transmitted from the repeater 400.

In this exemplary embodiment of the present invention, it is assumed that the fourth user terminal 310 and the fifth user terminal 320 belong to the second communication area, and communication links Lr1 and Lr2 are established between the repeater and the user terminals 310 and 320 belonging to the second communication area, respectively. In addition, a communication link LM 1 is established between the repeater 400 and the satellite 100.

In the above-mentioned communication system, the structure of a radio resource reuse system (hereinafter, referred to as a repeater) capable of reusing radio resources will be described with reference to FIG. 2. The term 'radio resource' means time, frequency, code, and space that are allocated to transmit data by the communication system.

For example, in the CDMA scheme, each spreading code for data transmission is the radio resource. In the FDM scheme, each unit frequency is the radio resource. In the OFDM scheme, a subcarrier or a subchannel, which is a set of subcarriers, is the radio resource. In this exemplary embodiment of the present invention, for convenience of description, the OFDM scheme is used as an example of the communication system.

Figure 2:
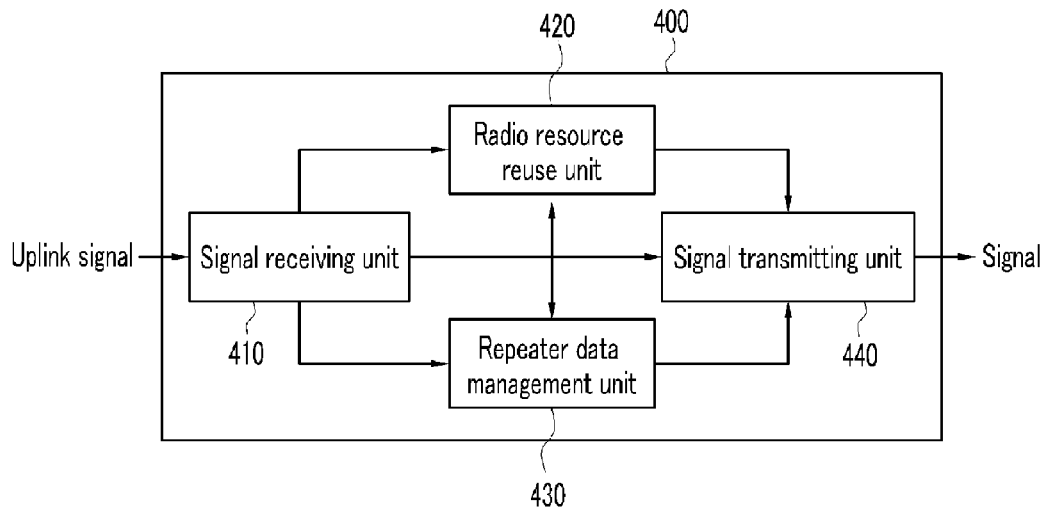
FIG. 2 is a diagram illustrating the structure of a repeater according to the exemplary embodiment of the present invention.

FIG. 2 is a diagram illustrating the structure of the repeater according to the exemplary embodiment of the present invention.

As shown in FIG. 2, the repeater 400 includes a signal receiving unit 410, a radio resource reuse unit 420, a repeater data management unit 430, and a signal transmitting unit 440.

The signal receiving unit 410 restores signals received through the link LM1 or Lp. In addition, the signal receiving unit 410 measures the intensity of signals transmitted from the terminals in the first communication area to the repeater among the received signals, and transmits information on the measured signal intensity to the radio resource reuse unit 420.

The repeater data management unit 430 manages data received from the satellite, and generates and manages repeater data. The repeater data means unique data of the repeater to be transmitted to the user terminals that communicate with the repeater.

The repeater data includes data to be transmitted from the satellite to the user terminals positioned in the second communication area, and data generated and managed by the repeater for various purposes such as broadcasting data only for the user terminal in the second communication area. Therefore, the repeater data may be arbitrary data different from the data transmitted from the satellite, or it may be the same data as that which is received from the satellite and then newly processed by the repeater. That is, the repeater data means all data that should be transmitted to the user terminals positioned in the second communication area AREA 2 for various purposes.

The signal transmitting unit 440 transmits the signals from the repeater data management unit 430 to the user terminals in the second communication area using the radio resource determined by the radio resource reuse unit 420, which will be described below.

The radio resource reuse unit 420 determines a radio resource that can be reused by the repeater among the radio resources of the entire system, on the basis of the radio intensity information received from the signal receiving unit 410. The radio intensity means the radio intensity of the signal transmitted from the user terminal in the first communication area to the repeater. In this case, the signal is transmitted to the repeater through the link Lp. The radio resource reuse unit 420 determines a reusable radio resource among the radio resources of the entire system by the following process.

First, the radio resources of the entire system are classified into two groups according to the communication areas. This will be described with reference to FIGS. 3 and 4. Here, the repeater or a terrestrial station (not shown) may perform the classification of the radio resource.

Figure 3:
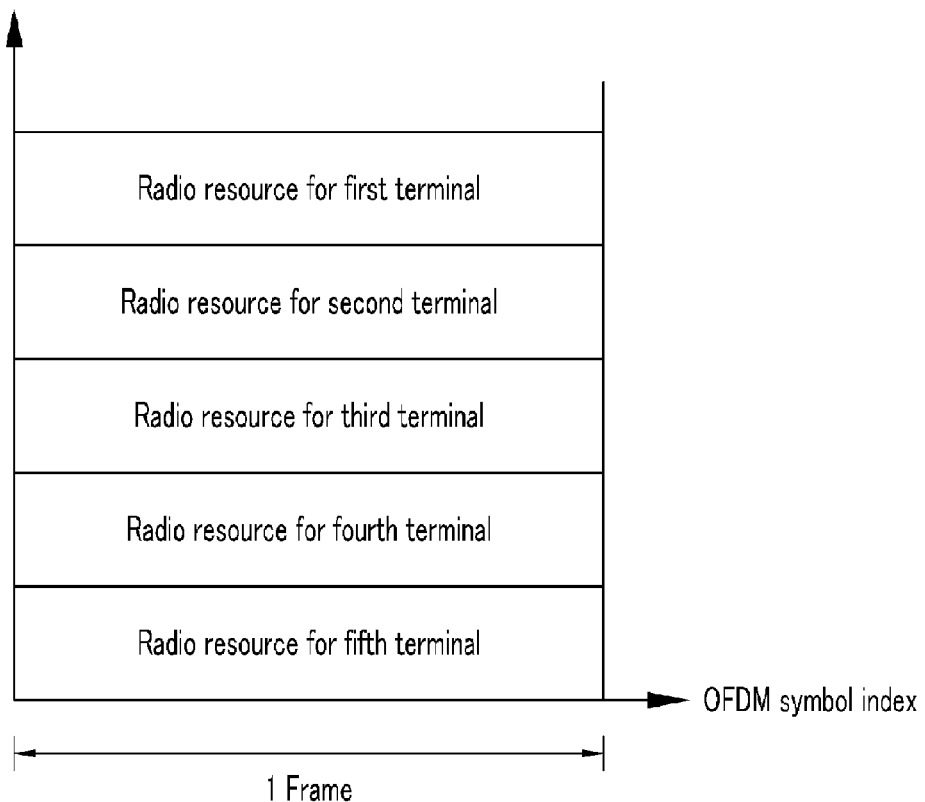
FIG. 3 is a diagram illustrating an example of classifying all radio resources according to the exemplary embodiment of the present invention.
Figure 4:
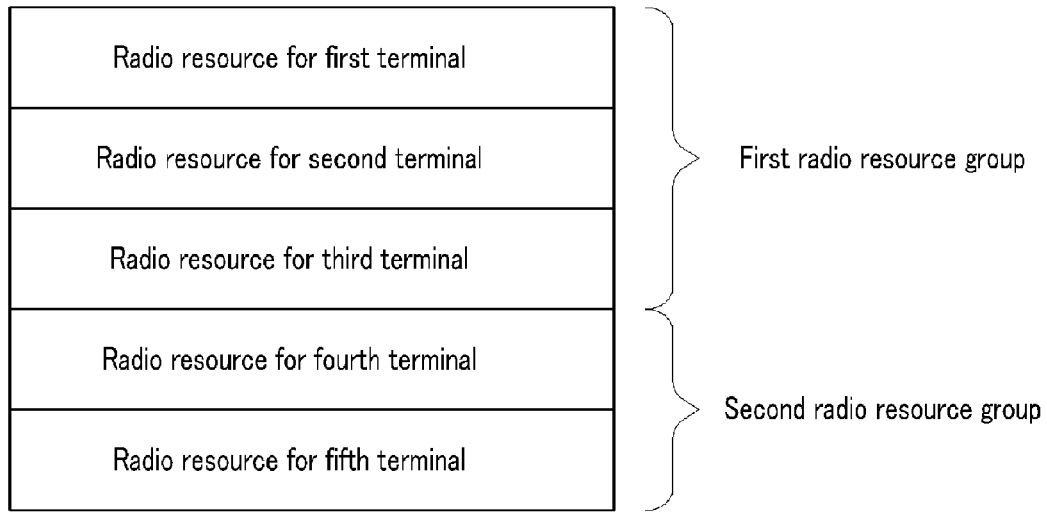
FIG. 4 is a diagram illustrating an example of the use of all the radio resources according to the exemplary embodiment of the present invention.

FIG. 3 is a diagram illustrating an example of classifying all the radio resources according to the exemplary embodiment of the present invention, and FIG. 4 is a diagram illustrating an example of the use of all the radio resources according to the exemplary embodiment of the present invention.

FIG. 3 shows a radio resource corresponding to an arbitrary frame of the OFDM scheme that transmits data in units of a frame. The radio resources used by a plurality of user terminals (the first user terminal to the fifth user terminal) in the entire system are referred to as first to fifth user terminal radio resources.

As shown in FIG. 4, among the radio resources, the radio resources used by the user terminals positioned in the satellite coverage, which is the first communication area, are classified into a first radio resource group. The radio resources used by the user terminals positioned in the repeater coverage, which is the second communication area, are classified into a second radio resource group.

In the classified radio resource groups, the user terminals in the second communication area use only the second radio resource. That is, the user terminals in the second communication area do not use the first radio resource. Therefore, even when the repeater uses the first radio resource to transmit the repeater data to the user terminals in the second communication area, no interference occurs between the user terminals in the second communication area. In the exemplary embodiment of the present invention, the repeater reuses the radio resource in the first radio resource group to transmit the repeater data to the user terminals in the second communication area, on the basis of the above-mentioned characteristics.

When the radio resources are classified as described above, the radio resource reuse unit 420 selects a reusable radio resource required to transmit the repeater data. As the reusable radio resource, the radio resource belonging to the first radio resource group is used, and the reusable radio resource is selected as follows.

First, the signal receiving unit 410 measures the intensity of radio waves transmitted from each of the user terminals in the first communication area. It is possible to arrange the radio resources used by the user terminals on the basis of the measured intensity. When the radio resources are arranged in ascending order, the radio resource at a higher level among the arranged radio resources is selected as the reusable radio resource.

For example, assuming that the communication links Ls1 to Ls3 shown in FIG. 1 are two-way links, each of the user terminals in the first communication area transmits an uplink radio wave in order to transmit data to the satellite. Since the radio wave is transmitted through the two-way link, it is also transmitted to the repeater as well as the satellite.

That is, the uplink radio waves transmitted from the user terminals in the first communication area are transmitted to the repeater through the links Lp1 to Lp3. Therefore, the signal receiving unit 410 of the repeater can measure the intensity PL of the radio waves transmitted through the links Lp1 to Lp3. In the exemplary embodiment of the present invention, it is assumed that the intensities of the radio waves through the links Lp1 to Lp3 measured by the signal receiving unit 410 are PL1=20, PL2=10, and PL3=100, respectively. As the numeral value increases, a received power value increases.

The radio resource reuse unit 420 arranges the radio intensity information of the links Lp1 to Lp3 measured by the signal receiving unit 410 in ascending order, which is shown in the following Table 1.

TABLE 1

| Radio resource of target to be reused | Measured power value of link Lp | Priority for reuse |
|---|---|---|
| Radio resource of second terminal | 10 | 1 |
| Radio resource of first terminal | 20 | 2 |
| Radio resource of third terminal | 100 | 3 |

Here, the measured power value of the link Lp is the intensity of the signal transmitted from each user terminal to the satellite 100 through the uplink, and when the measured power values of the link Lp are arranged in ascending order, the radio resource having the smallest power value has the highest priority for reuse.

The signal transmitting unit 440 uses the radio resource information arranged by the radio resource reuse unit 420 to transmit the repeater data managed by the repeater data management unit 430 to the user terminal in the second communication area. In this case, an appropriate radio resource is determined with reference to the amount of data to be transmitted to the user terminal in the second communication area and the measured power value of the link Lp arranged in Table 1.

As shown in Table 1, the measured power value of the link Lp for the radio resource of the third terminal is considerably larger than the measured power values of the link Lp for the radio resources of the first and second terminals. This means that, when the repeater reuses the radio resource for the third terminal, interference may occur in the third terminal. Therefore, when the measured power value of the link Lp is equal to or larger than a predetermined reference value, the radio resource is not reused.

The above-mentioned radio resource reuse method will be described below with reference to FIG. 5.

Figure 5:
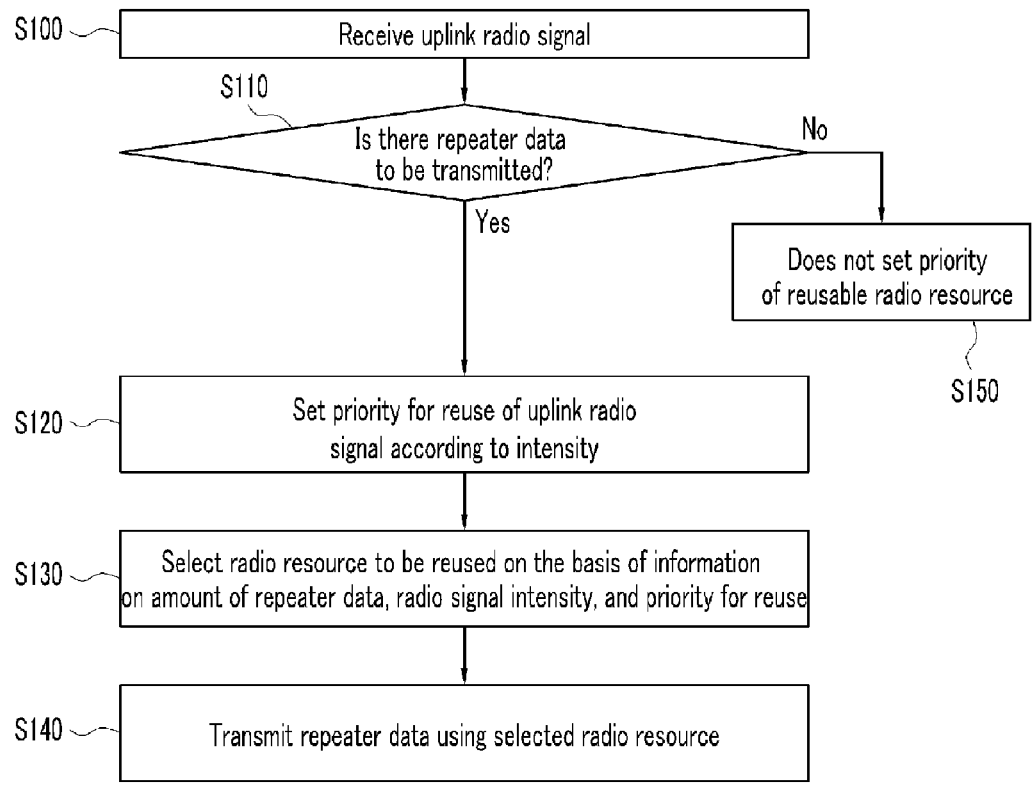
FIG. 5 is a flowchart illustrating a method of reusing radio resources according to another exemplary embodiment of the present invention.

FIG. 5 is a flowchart illustrating a method of reusing radio resources according to another exemplary embodiment of the present invention.

As shown in FIG. 5, the signal receiving unit 410 of the repeater receives uplink radio signals transmitted from the first to third user terminals in the first communication area to the satellite (S100). Then, the radio resource reuse unit 420 determines whether there is repeater data in the repeater data management unit 430 (S110). The repeater data means data to be transmitted from the repeater to the fourth and fifth user terminals 310 and 320 in the repeater coverage, that is, the second communication area.

The repeater data may be generated by the repeater data management unit 430 in the following three cases. In the exemplary embodiment of the present invention, thee cases are exemplified, but the invention is not limited thereto.

First, when data is generated by an H-ARQ (hybrid automatic repeat request) or an ARQ (automatic repeat request)

from the user terminal in the second communication area, the generated data is referred to as the repeater data. The repeater data will be described in more detail below. The repeater transmits data received from the satellite to the user terminals in the second communication area, and buffers the data for a predetermined time in order to transmit the data to the user terminals in response to the ARQ or H-ARQ. Then, when receiving the ARQ or H-ARQ to transmit data from an arbitrary user terminal in the second communication area, the repeater retransmits a portion of the buffered data. The retransmitted data is the repeater data.

In this case, the repeater uses the radio resource ensured by the radio resource reuse unit 420 to transmit an H-ARQ packet to the user terminal, instead of being allocated with an additional radio resource for transmitting the H-ARQ packet from a core network (not shown).

Second, when data is generated due to a variation in a modulation scheme and a coding scheme, the generated data is referred to as the repeater data. Referring to FIG. 1, when data of the fourth and fifth terminals received through the link LM1 is transmitted to the fourth and fifth terminals through the links Lr1 and Lr2, the repeater checks the modulation and coding schemes. If the coding rate of the modulation scheme and the coding scheme of the link LM1 are lower than those of the modulation schemes and the coding schemes of the links Lr1 and Lr2, the repeater data is generated.

Specifically, it is assumed that the link LM1 uses QPSK and a code rate of ¾ to modulate and encode data and the links Lr1 and Lr2 use BPSK and a coding rate of ½ to modulate and encode data. In this case, it is necessary to additionally transmit a larger number of bits of data to the links Lr1 and Lr2 than to the link LM1. The additionally generated data is referred to as the repeater data.

Third, local information broadcast to only the second communication area is also referred to as the repeater data. In this case, the local information is broadcast to the fourth and fifth terminals using the reused radio resource.

Then, in step S110, when the repeater data management unit 430 determines that there is the repeater data in any of the above-mentioned cases, the radio resource reuse unit 420 sets priority for reuse for the intensity of the uplink radio waves (S120). Then, the radio resource reuse unit 420 selects a radio resource used to transmit data to the fourth and fifth terminals, on the basis of information on the amount of repeater data, radio wave intensity, and the priority for reuse (S130).

The used radio resource means the radio resource used in the first communication area. The reused radio resource is any of the resources that are set as reusable radio resource candidates. In this case, the measured radio intensity is compared with a predetermined threshold value. Then, only when the measured radio intensity is lower than the threshold value, the radio resource is set as the reusable radio resource.

Finally, the signal transmitting unit 440 uses the radio resource selected by the radio resource reuse unit 420 to transmit the repeater data stored in the repeater data management unit 430 to the user terminals (S140).

The above-described exemplary embodiment of the present invention can be applied to programs that allow computers to execute functions corresponding to the configurations of the exemplary embodiments of the invention or recording media including the programs as well as the method and apparatus. Those skilled in the art can easily implement the applications from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of reusing radio resources, comprising:
measuring intensities of a plurality of radio signals that are transmitted from a first terminal group including a plurality of terminals positioned in a first communication area to a wide area transmitting/receiving apparatus;
determining whether there is repeater data to be transmitted to a second terminal group including a plurality of terminals positioned in a second communication area;
based on determining that there is repeater data to be transmitted, setting a priority of reuse for respective ones of a plurality of radio resources that transmit the plurality of radio signals on the basis of the measured intensities of the plurality of radio signals; and
selecting a reusable radio resource on the basis of the set priority, and transmitting the repeater data to the plurality of terminals included in the second terminal group using the selected reusable radio resource.

2. The method of claim 1, further comprising:
before the measuring of the intensities of the radio signals, setting a radio resource used by the first terminal group in the first communication area as a first radio resource, and setting a radio resource used by the second terminal group in the second communication area as a second radio resource.

3. The method of claim 2, wherein the first communication area is a communication area in which the wide area transmitting/receiving apparatus can directly communicate with a plurality of terminals included in the first terminal group, and the second communication area is a communication area in which signals transmitted from the wide area transmitting/receiving apparatus are transmitted to a plurality of terminals included in the second terminal group through a repeater.

4. The method of claim 1, wherein the setting of the priority includes setting respective priorities of resources used by a plurality of terminals using the plurality of radio signals as reusable radio resource candidates so as to be inversely proportional to the measured intensities of the plurality of radio signals.

5. The method of claim 4, wherein the measured intensities of the plurality of radio signals are intensities of signals that are transmitted from a plurality of terminals included in the first terminal group to the wide area transmitting/receiving apparatus through uplinks.

6. The method of claim 4, wherein the respective priorities of the reusable radio resource candidates are determined on the basis of information on resource numbers allocated to the plurality of radio resources, a measured radio signal intensity, and priority for reuse.

7. The method of claim 6, wherein, based on the measured radio signal intensity being lower than a predetermined radio signal intensity, a corresponding radio resource is set as a reusable radio resource candidate.

8. The method of claim 1, wherein the repeater data is any one of local broadcasting data for the second communication area, an ARQ or H-ARQ (hybrid automatic repeat request) packet requested by the second terminal group, and transmission scheme information including information on a data modulation scheme and a coding scheme.

9. The method of claim 8, wherein, based on an arbitrary terminal of the second terminal group requesting the ARQ or H-ARQ, among buffered packets to be retransmitted to the second terminal group, the ARQ or H-ARQ packet is retransmitted to the terminal.

10. A system for reusing radio resources comprising:
- a signal receiving unit that receives a plurality of radio signals transmitted from a first terminal group including a plurality of terminals positioned in a first communication area to a wide area transmitting/receiving apparatus;
- a radio resource reuse unit that calculates intensities of the plurality of received radio signals, and determines a priority of reusable radio resources that will be reused in the second communication area among the plurality of radio signals, on the basis of the calculated intensities of the plurality of radio signals;
- a repeater data management unit that manages repeater data to be transmitted to a second terminal group including a plurality of terminals positioned in a second communication area; and
- a signal transmitting unit that transmits the determined reusable radio resources and the repeater data to the terminals included in the second terminal group.

11. The system of claim 10, wherein the first communication area is a communication area in which the wide area transmitting/receiving apparatus can directly communicate with the plurality of terminals included in the first terminal group, and the reusable radio resources are used in only the first communication area.

12. The system of claim 10, wherein the repeater data is transmitted to the second terminal group through a repeater.

* * * * *